US012080495B1

(12) United States Patent
Boman et al.

(10) Patent No.: US 12,080,495 B1
(45) Date of Patent: Sep. 3, 2024

(54) CROSSWALK LIGHTING SYSTEM AND SYSTEM MAT

(71) Applicants: Bertho Boman, Plantation, FL (US); Wael Majdalawi, Delray Beach, FL (US)

(72) Inventors: Bertho Boman, Plantation, FL (US); Wael Majdalawi, Delray Beach, FL (US)

( * ) Notice: Subject to any disclaimer, the term of this patent is extended or adjusted under 35 U.S.C. 154(b) by 0 days.

(21) Appl. No.: 17/300,893

(22) Filed: Dec. 9, 2021

(51) Int. Cl.

| | |
|---|---|
| ***G08G 1/005*** | (2006.01) |
| ***F21S 9/03*** | (2006.01) |
| ***F21V 23/00*** | (2015.01) |
| ***F21V 23/04*** | (2006.01) |
| ***G08G 1/07*** | (2006.01) |
| ***H01H 3/02*** | (2006.01) |
| *F21W 131/103* | (2006.01) |

(52) U.S. Cl.
CPC ................ *H01H 3/02* (2013.01); *F21S 9/03* (2013.01); *F21V 23/007* (2013.01); *F21V 23/0471* (2013.01); *G08G 1/005* (2013.01); *G08G 1/07* (2013.01); *F21W 2131/103* (2013.01)

(58) Field of Classification Search
USPC ....... 340/944, 902, 925, 929, 972, 973, 994, 340/995.11, 995.22, 426.16, 438, 464, 340/477, 539.22, 539.3
See application file for complete search history.

(56) References Cited

U.S. PATENT DOCUMENTS

| | | | | |
|---|---|---|---|---|
| 10,233,911 | B2 * | 3/2019 | Shani | F03G 7/08 |
| 10,403,129 | B1 * | 9/2019 | Suarez | G08B 6/00 |
| 2005/0141997 | A1 * | 6/2005 | Rast | F41A 19/03 416/229 R |
| 2007/0133844 | A1 * | 6/2007 | Waehner | G06V 10/145 382/118 |
| 2017/0252256 | A1 * | 9/2017 | Henshue | E01C 5/20 |
| 2018/0255426 | A1 * | 9/2018 | Liao | H04B 17/318 |
| 2021/0012655 | A1 * | 1/2021 | Reeves | G08G 1/005 |

* cited by examiner

*Primary Examiner* — Daniel Previl
(74) *Attorney, Agent, or Firm* — Frank L. Kubler

(57) ABSTRACT

A crosswalk lighting system for alerting drivers that a person is entering or crossing at a crosswalk includes a road marked with a crosswalk; at least one alert light mounted one of on and adjacent to the crosswalk; a system power source; a system circuit connected to the system power source and to the at least one alert light; and a system mat containing a weight-activated switch and mounted adjacent to the road at a first end of the crosswalk for activation in response to the weight of a pedestrian stepping on a system mat as the pedestrian approaches the entrance of the crosswalk.

24 Claims, 10 Drawing Sheets

CROSSWALK LIGHTING SYSTEM AND SYSTEM MAT

BACKGROUND OF THE INVENTION

1. Field of the Invention

The present invention relates generally to the field of street crosswalks and crosswalk lighting systems. A crosswalk is understood to be a location on a road designated for pedestrians to cross which is identified with paint or some other form of marking and in some cases a crossing alert lighting system. More specifically, the present invention relates to crosswalk lighting system for alerting drivers that a person is entering or crossing at a crosswalk. The system includes at least one alert light mounted on or adjacent to a crosswalk, a system circuit, a system power source and a system activating switch mechanism in the form of a system mat containing a weight-activated switch and mounted to a surface adjacent to the road at a first end of the crosswalk. The system mat distinguishes the present crosswalk lighting system from prior such systems in that the system is activated by the weight of a person stepping on the mat as he or she approaches the entrance of the crosswalk. As a result of this inventive feature, safety does not depend on a pedestrian noticing or remembering to press a button to activate crossing alert lights or on a more expensive and less reliable radar or infrared detector, light beam, smart camera or ultrasound sensor.

The at least one alert light preferably includes a spaced series of alert lights embedded in and extending across the road adjacent and parallel to the crosswalk. First and second weight-activated system mats preferably are provided on first and second sides of the road at opposing first and second entrances to the crosswalk, respectively. The system preferably includes a control circuit connected to the system circuit and housed in a control box which preferably is mounted to a post containing circuit wires located next to the system mat. The system mat is connected to the control circuit through the system circuit. When a person steps on the mat and thus closes the weight-activated switch, the system circuit delivers electric power from the power source to the control circuit which activates the alert lights either continuously or in intermittent flashes, for a preset length of time sufficient for a pedestrian to cross the road. The power source preferably is, or includes, a solar panel mounted to the top of each system post and oriented to gather sunlight.

The system mat, which is the key inventive feature of the present invention, includes a base layer, a switch structure on top of the base layer, and a protective layer on top of the switch structure, and differs structurally from existing pressure sensing mats and platforms used for other purposes. The base layer preferably is formed of non-corrosive material such as stainless steel or cast aluminum. The switch structure is of conventional design and is formed of a top conductor sheet having at least one top contact and a bottom conductor sheet having at least one bottom contact separated by a resilient, compressible sheet having at least one contact opening registering with the at least one top contact and the at least one bottom contact. As a result, downward pressure on the top contact sheet compresses the compressible sheet until the at least one top contact and the at least one bottom contact touch each other through the contact opening and thereby close the switch and circuit within the system mat. The protective layer is formed of polymer or rubberized material and has a non-slip upper surface which includes ADA domes to be recognizable by touch to the blind.

The system mat is fitted into a wide and shallow mat recess formed in the sidewalk concrete, with a mat recess depth substantially matching the mat thickness so that the upper surface of the mat is flush with the sidewalk upper surface, and pedestrians do not trip on the edge of the mat. The system mat also can be surface-applied on top of existing sidewalk concrete, and the edges of the system mat can be sloped to the sidewalk to prevent a pedestrian from tripping on it.

A preferred additional feature of the system to make the system mat easier to remove and install is a junction box with wire passing holes in its sides into which two mat wires and two system circuit wires are inserted and respectively electrically connected together so as to be easily removable from each other. As a result, a system mat can be quickly installed and electrically connected with minimal tools and skill requirements. Alternatively, the system mat is formed of hard rubber containing spaced apart contact wires or metal contact sheets, and is simply glued to the surface of the sidewalk at a crosswalk entrance.

The system mat alternatively is connected to the control box circuit wirelessly. For this version, activation signals are sent from a mat transmitter (not shown) to a control circuit receiver (not shown). The energy powering the system is provided by and originates through the system mat. The wireless connection eliminates the need for a communication cable. An RF transmitter is placed inside the box.

2. Description of the Prior Art

There have long been crosswalks marking where pedestrians are permitted to cross streets, particularly busy streets in cities, and alerting drivers of where to expect pedestrians so that they may proceed with appropriate caution. A problem has been that drivers do not always see crosswalks, particularly at night, and also may not notice a pedestrian as they are just entering a crosswalk.

Crossing alert lighting systems have been developed to call the attention of drivers to pedestrians entering and crossing at crosswalks. These systems typically include lights mounted on or in the road at the crosswalk to attract the attention of drivers, and light activation mechanisms to turn on the lights when a pedestrian is about to enter the crosswalk. These activation mechanisms have included a traditional push button switch mounted to a pole located at a crosswalk entrance, a sensor light beam extending across the entrance to the crosswalk with an opposing photocell which a pedestrian breaks when entering, a smart camera, an ultrasonic sensor, a radar based detector, as well as an infrared sensor.

Weight-activated switch mats have been used in industrial settings to make sure no one is standing next to a dangerous machine. The weight of a person on the switch mat prevents the machine from operating. Weight-activated switch mats also have been used at commercial and residential facilities to open doors.

It is thus an object of the present invention to provide a crosswalk lighting system and system mat which activates crossing alert lights with no action on the part of a pedestrian other than entering a crosswalk.

It is another object of the present invention to provide such a system and system mat which is simple and not subject to the technical failures of complex sensors, and is thus highly reliable.

It is still another object of the present invention to provide such a system and system mat which is easy to maintain, repair and service.

It is another object of the present invention to provide a safer system because many pedestrians and bicyclists crossing tend to not push conventional pedestrian buttons.

It is finally an object of the present invention to provide such a system mat which is durable and inexpensive to manufacture.

SUMMARY OF THE INVENTION

The present invention accomplishes the above-stated objectives, as well as others, as may be determined by a fair reading and interpretation of the entire specification.

A crosswalk lighting system for alerting drivers that a person is entering or crossing at a crosswalk, the system including a road marked with a crosswalk; at least one alert light mounted one of on and adjacent to the crosswalk; a system power source; a system circuit connected to the system power source and to the at least one alert light; and a system mat containing a weight-activated switch and mounted adjacent to the road at a first end of the crosswalk for activation in response to the weight of a pedestrian stepping on a system mat as the pedestrian approaches the entrance of the crosswalk.

The at least one alert light preferably includes a spaced series of alert lights embedded in and extending across the road adjacent and parallel to the crosswalk. The system preferably includes the first and second weight-activated system mats respectively on first and second sides of the road at opposing first and second entrances to the crosswalk. The system preferably additionally includes a control box and a control circuit connected to the system circuit and housed in the control box, wherein the system mat is connected to the control circuit through the system circuit; so that when a pedestrian steps on the system mat and thereby closes the weight-activated switch, the system circuit delivers electric power from the power source to the control circuit which activates the at least one alert light one of continuously and in intermittent flashes, for a preset length of time for a pedestrian to cross the road.

The system preferably still additionally includes a system post mounted upright adjacent to the system mat, wherein the control box is mounted to the system post. The system power source can be either a solar panel mounted to the top of each system post and oriented to gather sunlight or other electric powered source.

The system mat preferably includes a switch structure positioned on top of the base layer, the switch structure being formed of a top conductor sheet having at least one top contact and a bottom conductor sheet having rat least one bottom contact, the top conductor sheet and the bottom conductor sheet being separated by a compressible sheet having at least one contact opening registering with the at least one top contact and the at least one bottom contact, so that downward pressure on the top contact sheet compresses the compressible sheet until the at least one top contact and the at least one bottom contact touch each other through t contact opening and thereby close the weight-activated switch and the circuit. The system mat preferably additionally includes a base layer beneath the switch structure, a protective layer on top of the switch structure, and a mat frame extending around the periphery of the mat and holding the mat layers together in stacked relation The base layer preferably is a panel formed of non-corrosive material. The protective layer preferably is formed of non-corrosive material. The protective layer preferably has a non-slip upper surface including several ADA domes to make the system mat recognizable by touch to the blind.

The system mat has a mat edge, and preferably includes a mat frame having channel members mounted along the periphery of the layers, so that one channel member extends along the edge of the mat, and the channel member has parallel channel side walls which fit snugly over the bottom surface of the base layer and the top surface of the protective layer. The system mat optionally has four mat edges, including several of the channel members, the channel members being interconnected at the corners of the system mat where the channel members meet.

The system preferably additionally includes a mat recess in the sidewalk, wherein the system mat is fitted into the mat recess, the mat recess having a depth matching the thickness of the system mat, so that the upper surface of the system mat is flush with the sidewalk to prevent pedestrians from tripping on the system mat. The mat recess preferably has a width and length matching the system mat width and length, and is located adjacent to a crosswalk entrance. The system can also be surface applied to an existing sidewalk.

The system preferably additionally includes a junction box with wire passing holes into which two mat wires and two system circuit wires pass and are electrically connected together, to be easily removable from each other; so that a system mat can be quickly and easily installed and electrically connected, and easily electrically disconnected and removed from the crosswalk lighting system. A junction box recess is preferably provided for receiving and mounting the junction box underneath the system mat, the junction box recess being formed in the sidewalk and recessed into the bottom of the mat recess.

The system mat alternatively is operationally connected to the control box circuit wirelessly, and additionally includes a signal transmitter connected to the system mat and a signal receiver connected to the control circuit. The system mat preferably includes a compressible sheet containing one of contact wires and contact plates connected to the system circuit.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
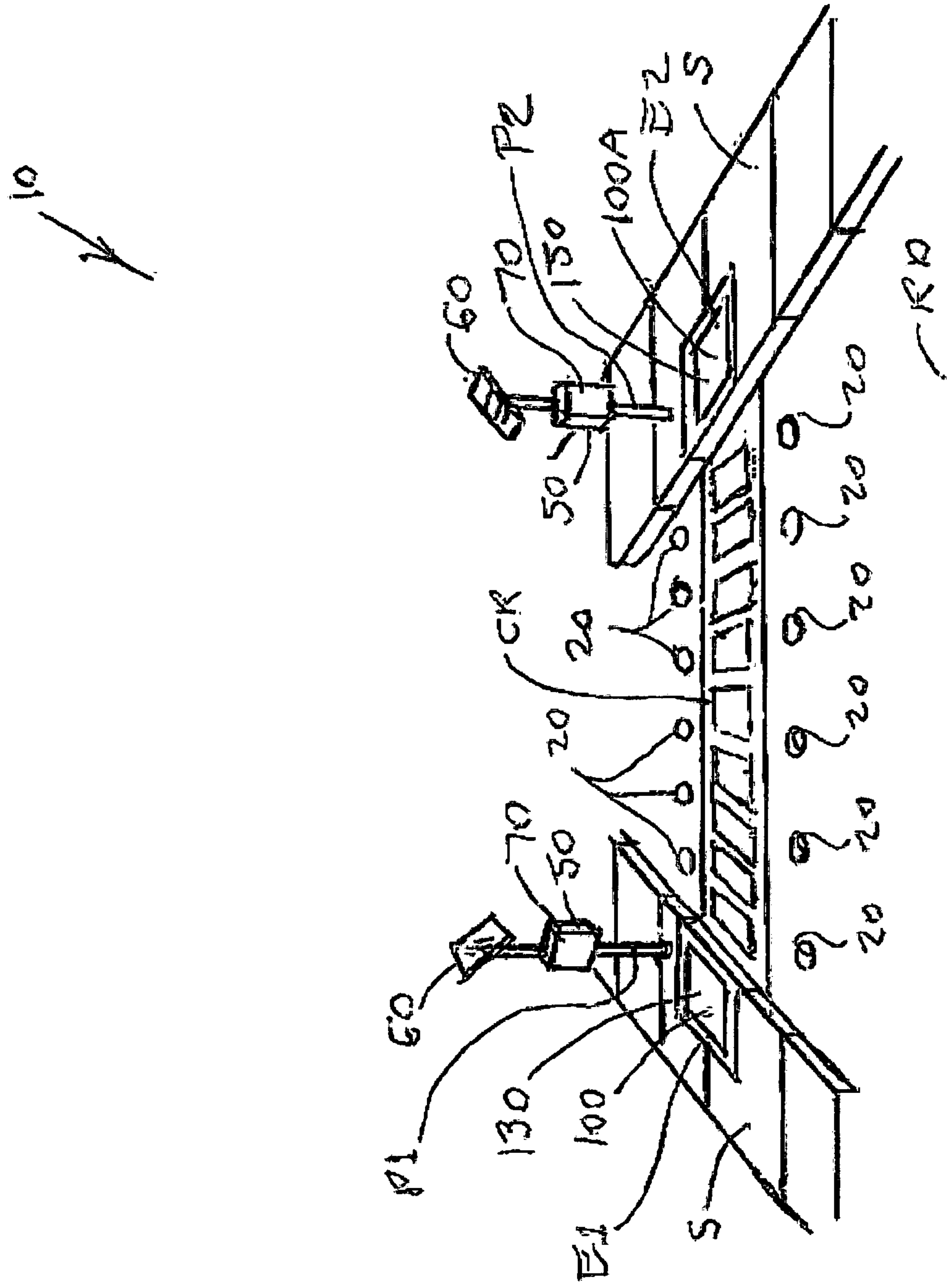
FIG. 1 is perspective view of a road and opposing sidewalks equipped with the preferred embodiment of the present crosswalk lighting system.
Figure 2:
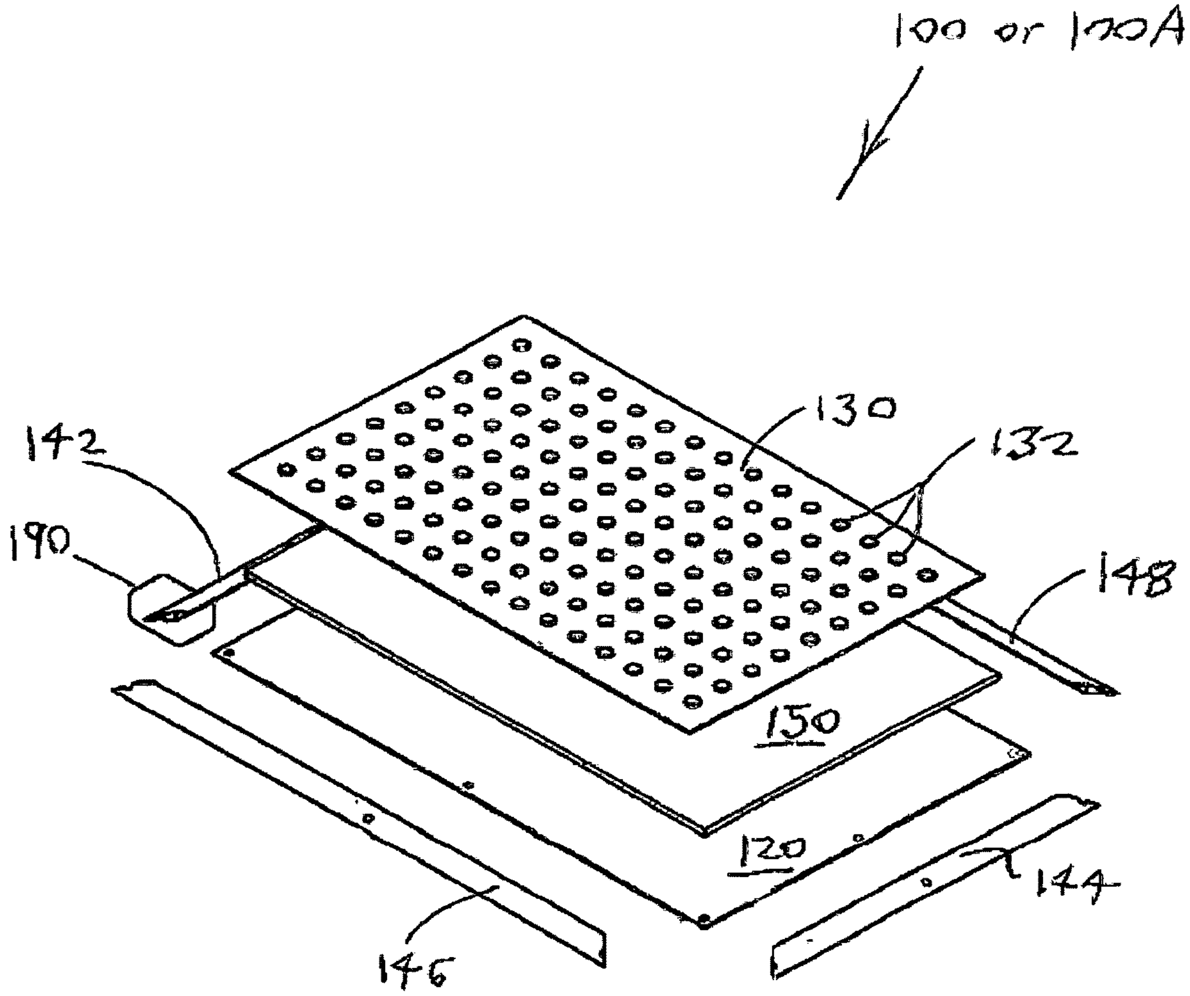
FIG. 2 is an exploded, perspective view of the system mat, showing three essential layers and mat frame.
Figure 3:
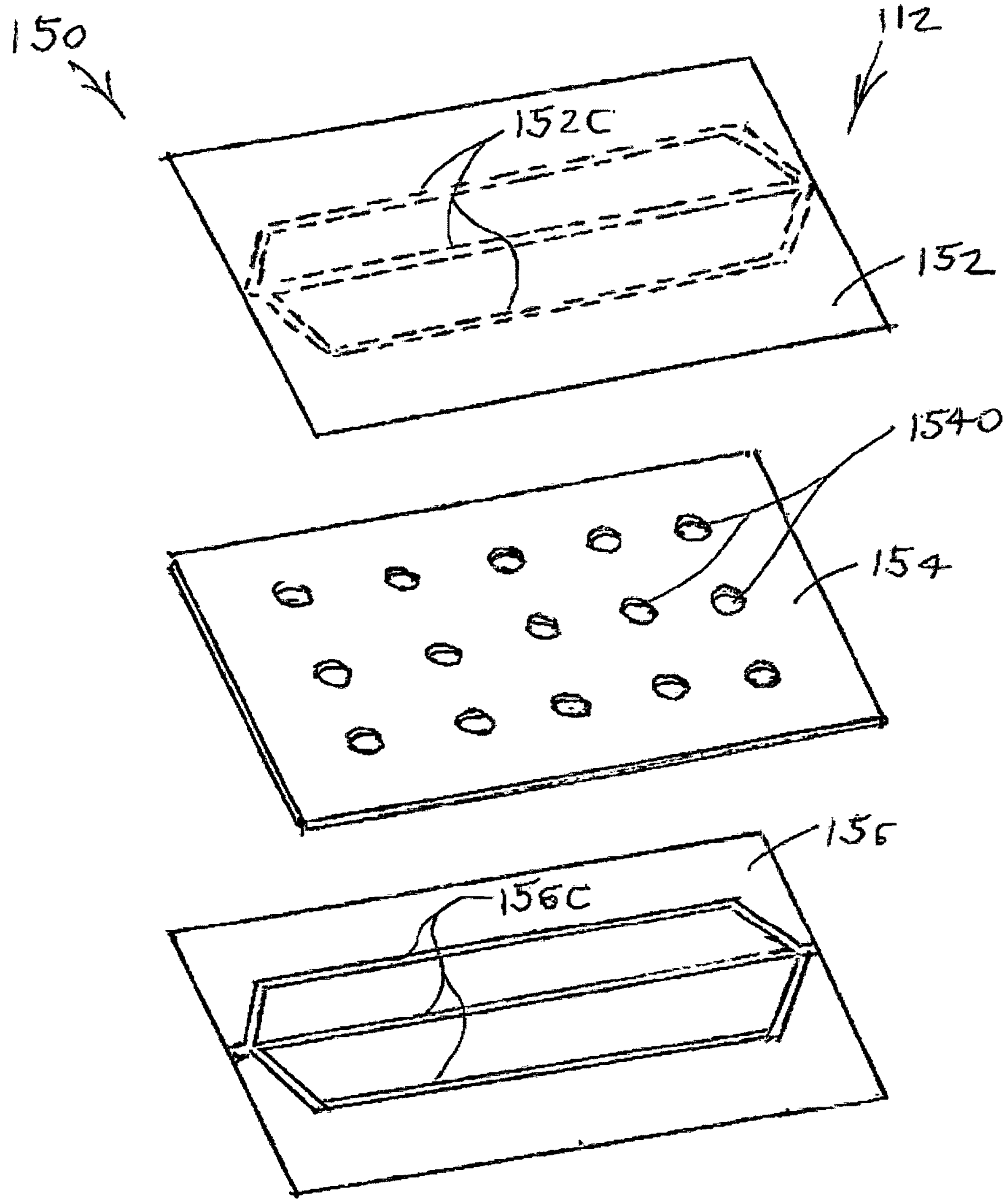
FIG. 3 is an exploded, perspective view of the first preferred switch structure of the present system mat.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1-10A, a crosswalk lighting system 10 for alerting drivers that a person is entering or crossing at a crosswalk is disclosed. The system 10 includes at least one alert light 20 mounted on or adjacent to a crosswalk CR, a system circuit 40, a system power source 60 and a system activating switch mechanism in the form of a system mat 100 containing a weight-activated switch 112 and mounted adjacent to the road RD at a first end of the crosswalk CR. The weight-activated switch 112 distinguishes the present crosswalk lighting system 10 from prior such systems by its activation in response to the weight of a person stepping on a system mat as they approach the entrance of the crosswalk.

The at least one alert light 20 preferably includes a spaced series of alert lights 20 embedded in and extending across the road RD adjacent and parallel to the crosswalk CR. First and second weight-activated system mats 100 and 100A preferably are provided on first and second sides of the road RD at opposing first and second entrances E1 and E2 to the crosswalk CR, respectively. The system 10 preferably includes a control circuit 50 having a control panel 52 and connected to the system circuit 40 and housed in a control box 70, one of which preferably is mounted to each of first and second system post P1 or P2 next to the road RD and system mat 100 or 100A. See FIGS. 10 and 10A. The system mats 100 and 100A are connected to the control circuit 50 through the system circuit 40. When a person steps on the mat 100 or 110A and thus closes the weight-activated switch 112, the system circuit 40 delivers electric power from the system power source 60 to the control circuit 50 which activates the alert lights 20 either continuously or in intermittent flashes, for a preset length of time sufficient for a pedestrian to cross the road. The power source 60 preferably is, or includes, a solar panel 60 mounted to the top of each system post P1 and P2 and oriented to gather sunlight.

The system mats 100 and 100A, which are the key inventive feature of the present invention, each include a base layer 120, a switch structure 130 on top of the base layer 120, and a protective layer 130 on top of the switch structure 130 and differs structurally from existing pressure sensing mats and platforms used for other purposes. See FIG. 2. The base layer 120 preferably is and sheet or plate formed of non-corrosive material such as stainless steel or cast aluminum. The weight of a pedestrian on top of the mat 100 or 100A activates the switch structure 130 so that it sends a signal to the control circuit 50 which in turn activates alert lights 20. A variety of preferred switch structures 150 are described below, although others are contemplated. For these switch structures 150, the mats 100 and 100A, preferably are rigid, and more specifically the protective layer 130 and base layer 120 must be rigid panels.

The protective layer 130 preferably is formed of polymer or rubberized material and has a non-slip upper surface which preferably includes ADA domes 132 to be recognizable by touch to the blind. ADA domes 132 are, at present, molded into concrete or metal surfaces at the entrances to crosswalks. The base layer 120, switch structure 150 and a protective layer 130 are held together by a mat frame 160 formed of four interconnected channel members 142, 144, 146 and 148. See FIG. 2. These channel members are mounted along the periphery of the stacked layers 120 and 130 containing between them switch structure 130, so that one such channel member extends along each edge of the rectangular mat 100 or 100A, and each such channel member has parallel channel side walls SW and SW1 which fit snugly over the edge of the bottom surface of the base layer 120 and over the edge of the top surface of the protective layer 130. The channel members 162, 164, 166 and 168 are interconnected at the mat corners where they meet. The mat frame 140 also protects the edges of the mat 100 or 100A.

The following are preferred versions of switch structure 150, explained more fully below, which operate on the following principles:

1. Mats 100 and 100A with internal wires or equivalent that short together.
2. A rigid, essentially non-moving platform (it only moves maybe 1/1000 of an inch) and loadcells measuring weight;
3. A rigid, moving platform on springs that physically moves downwardly with the weight of a person on the mat 100 or 100A to activate a switch or sensor; and
4. A flexible bladder under protective layer 130 where the internal pressure of the bladder changes as an indication of a person on the mat.

A first preferred switch structure 150 is compression activated and is formed of a top conductor sheet 152 having at least one top contact 152C and a bottom conductor sheet 156 having at least one bottom contact 156C separated by a resilient, compressible middle sheet 154 having at least one contact opening 1540 registering with the at least one top contact 152C and the at least one bottom contact 156C. See FIG. 3. As a result, downward pressure on the top contact sheet 152 compresses the compressible middle sheet 154 until the at least one top contact 152C and the at least one bottom contact 156C touch each other through a contact opening 1540 and thereby close the switch 112 and circuit within the system mat 100 or 100A.

Figure 4:
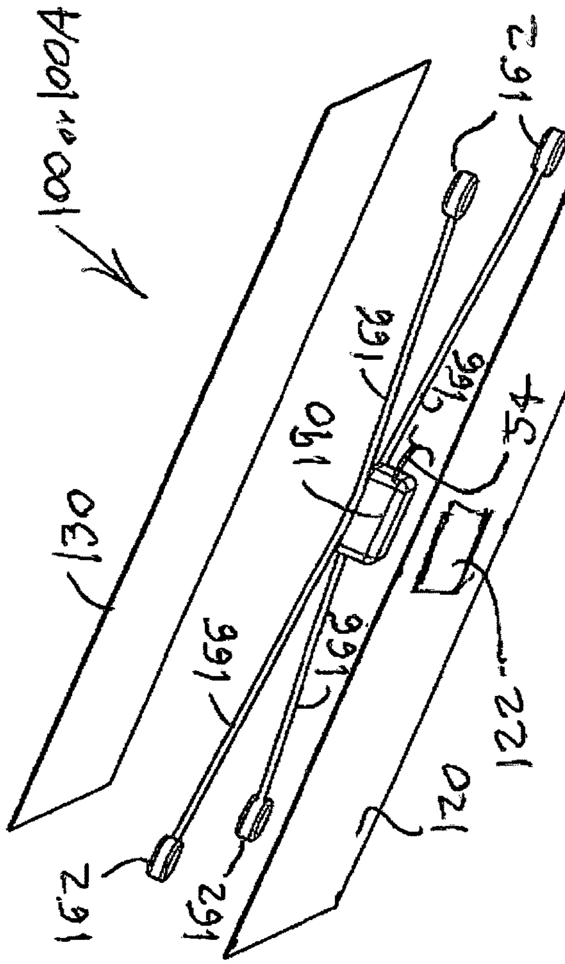
FIG. 4 is an exploded, perspective side-bottom view of the second preferred switch structure which is force-activated. A signal wire is shown in broken lines within each conduit.
Figure 4A:
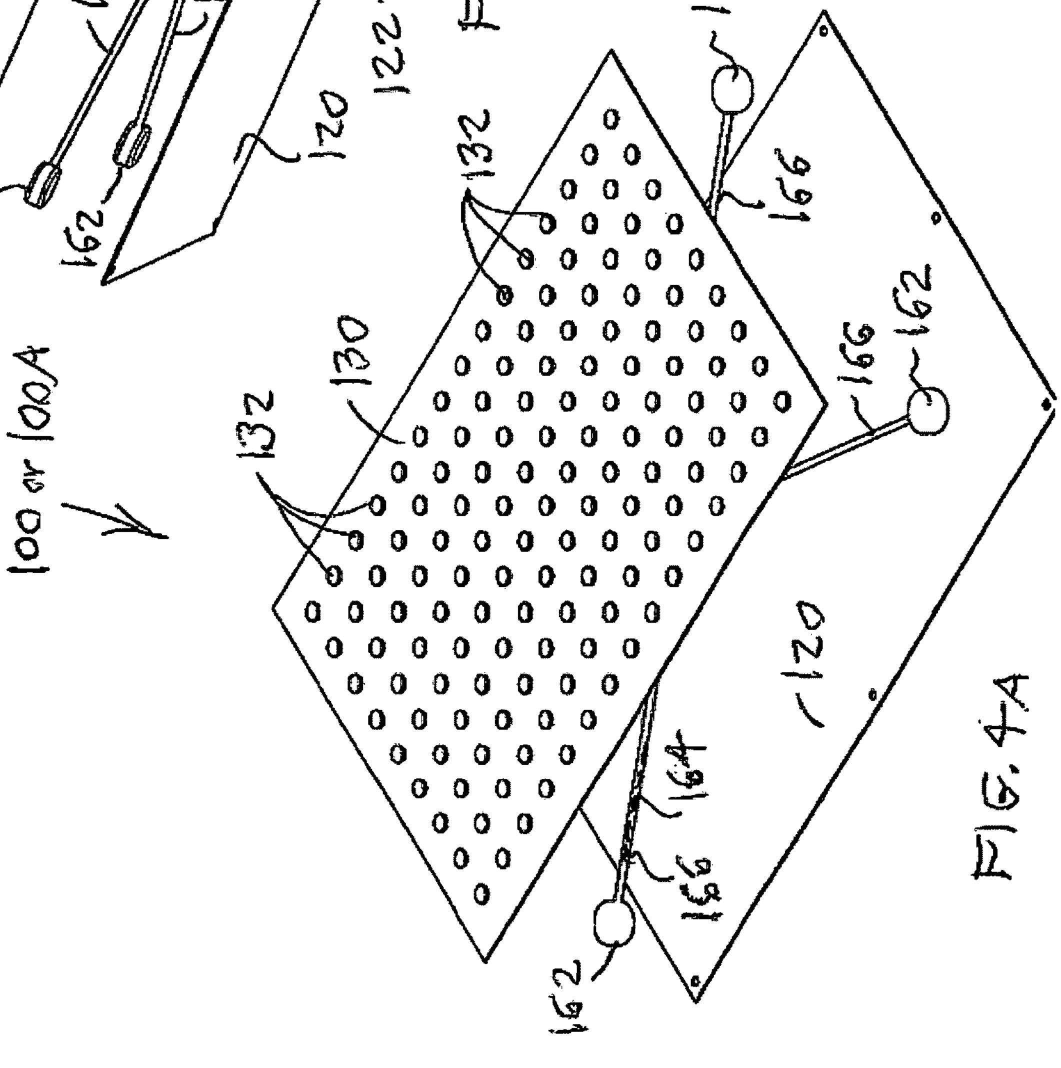
FIG. 4A is an exploded top view of the embodiment of FIG. 4.

A second preferred switch structure 150 is force-activated and includes at least one and preferably several force sensors in the form of load cells 162, such as the four load cells 162 illustrated in FIGS. 4 and 4A. "A load cell (or loadcell) is a transducer which converts force into a measured output".

Load Cells and Force Sensors, OMEGA™. The present load cells 162 are widely distributed within rectangular mat 100 and 100A, such as one at each corner, to detect the weight of a pedestrian when he or she steps onto any part of the mat 100 or 100A and thereupon to generate a weight detection signal conveying the amount of weight detected. A conduit 166 containing a signal wire 164 extends from each load cell 162 and carries the weight detection signal to a centrally located junction box 190, from which the weight detection signal is sent through a control circuit cable 54 to the control circuit 50. The control circuit 50, in turn, includes a microprocessor with programming which determines whether the weight detected by the load cell(s) 162 meets a minimum magnitude threshold requirement and, if so, activates the alert lights 20. The junction box 190 fits through a correspondingly sized and shaped box opening 122 in the mat base layer 120, and into a junction box recess 210 in the sidewalk concrete, as illustrated generally in FIG. 9. An example of a suitable load cell 162 is the 2" Diameter Miniature Button Compressor Load Cell manufactured by OMEGA™.

Figure 5:
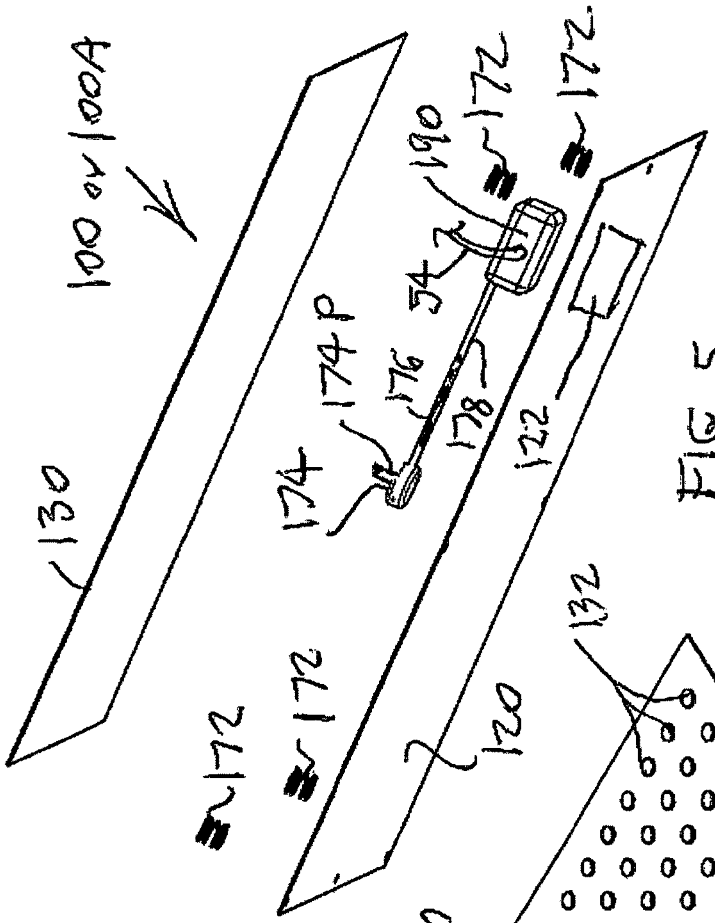
FIG. 5 is an exploded, perspective side-bottom view of the third preferred switch structure which is motion or movement-activated. The signal wire is shown in broken lines.
Figure 5A:
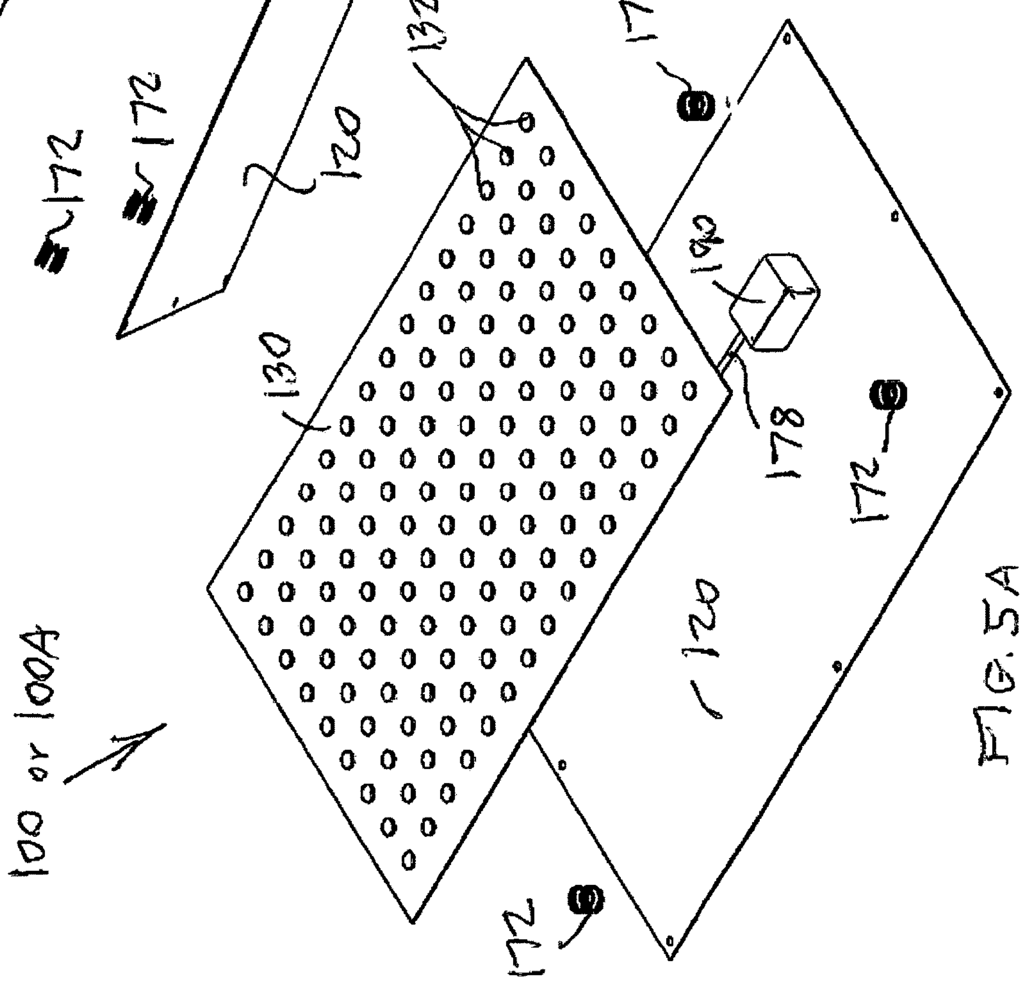
FIG. 5A is an exploded top view of the embodiment of FIG. 5.
Figure 9:
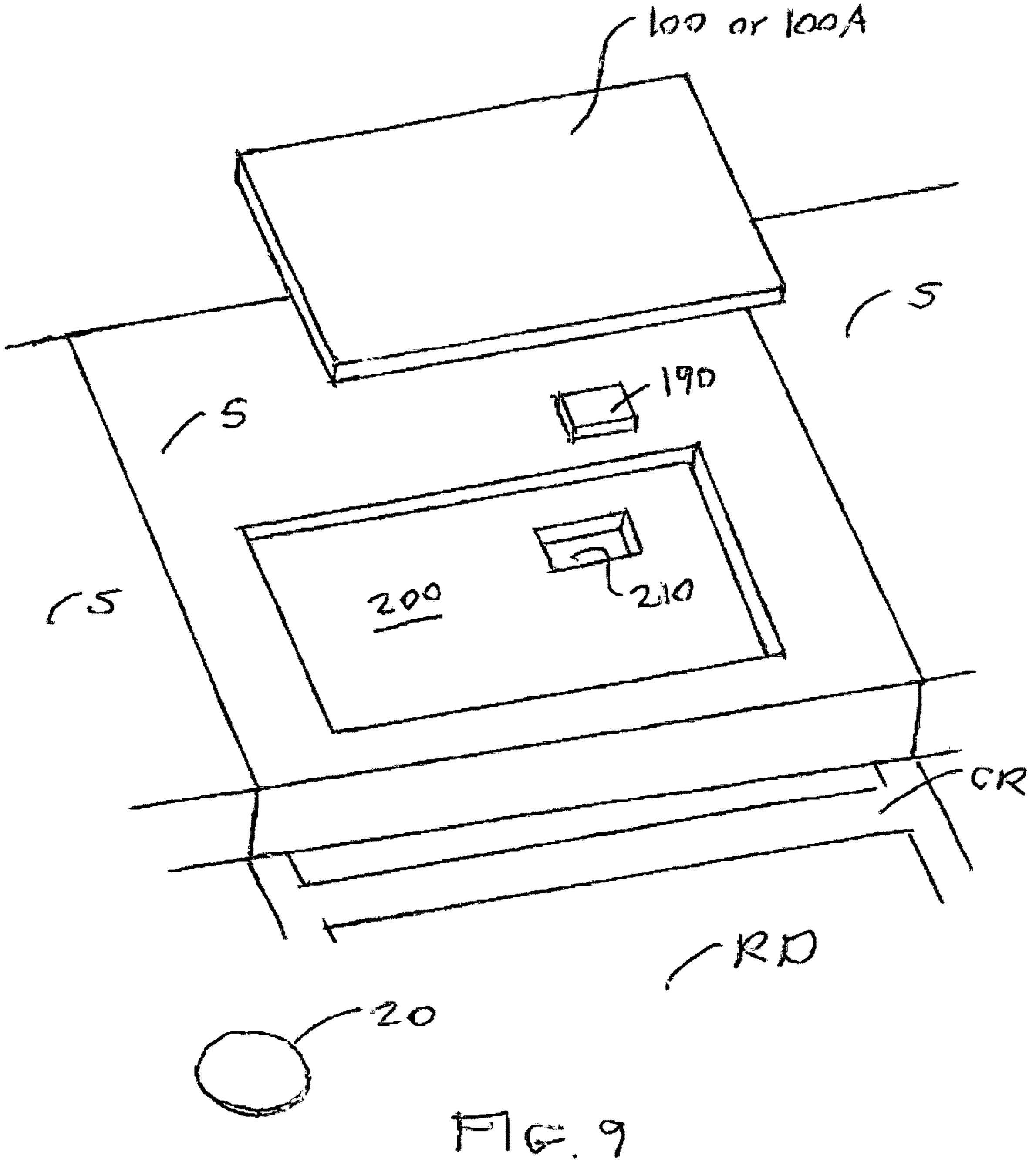
FIG. 9 is a perspective view of a segment of a sidewalk, road and crosswalk, showing in exploded relation the mat, junction box, mat recess and junction box recess in the sidewalk.
Figure 10:
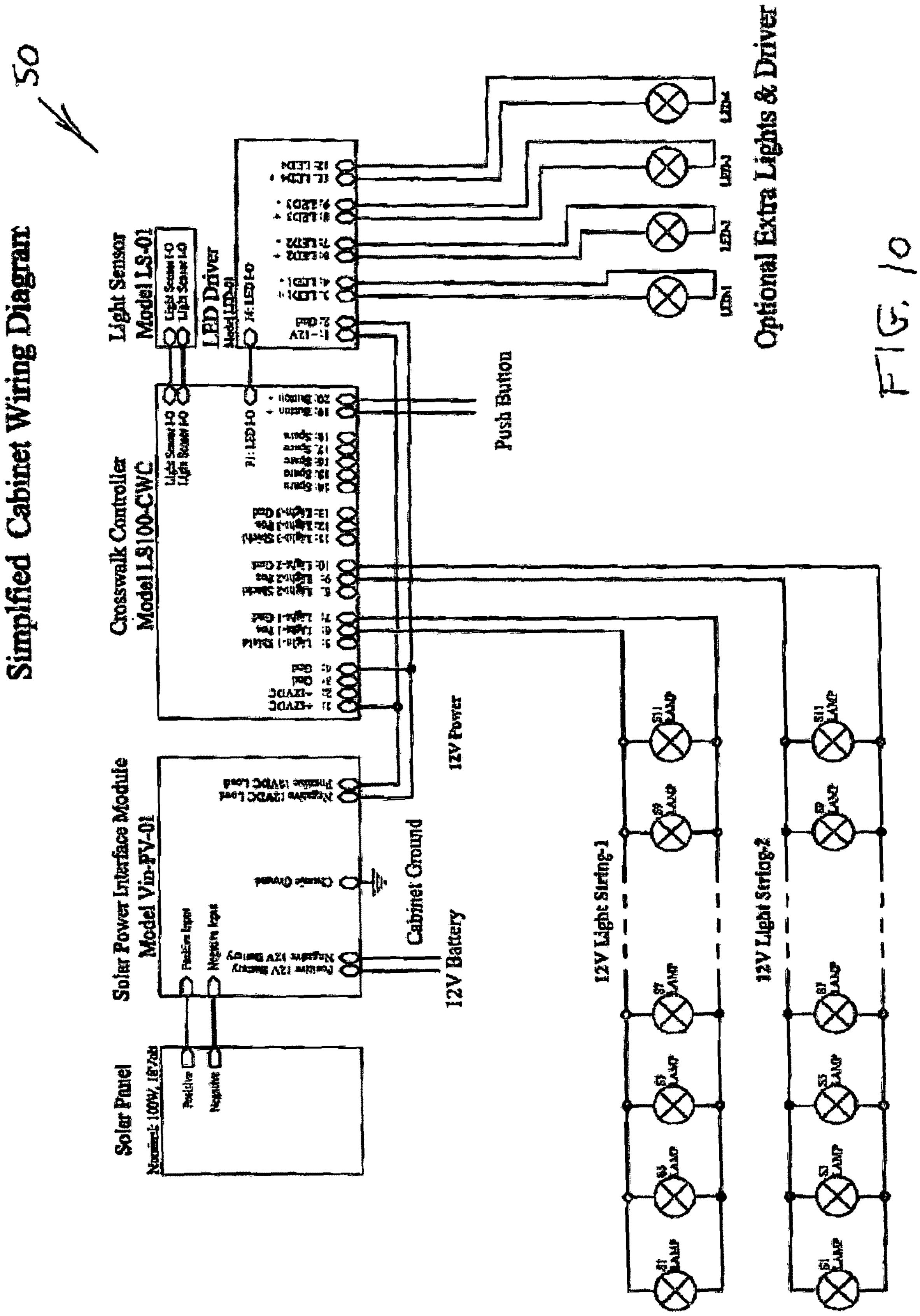
FIG. 10 is a circuit diagram of the present system circuit.
Figure 10A:
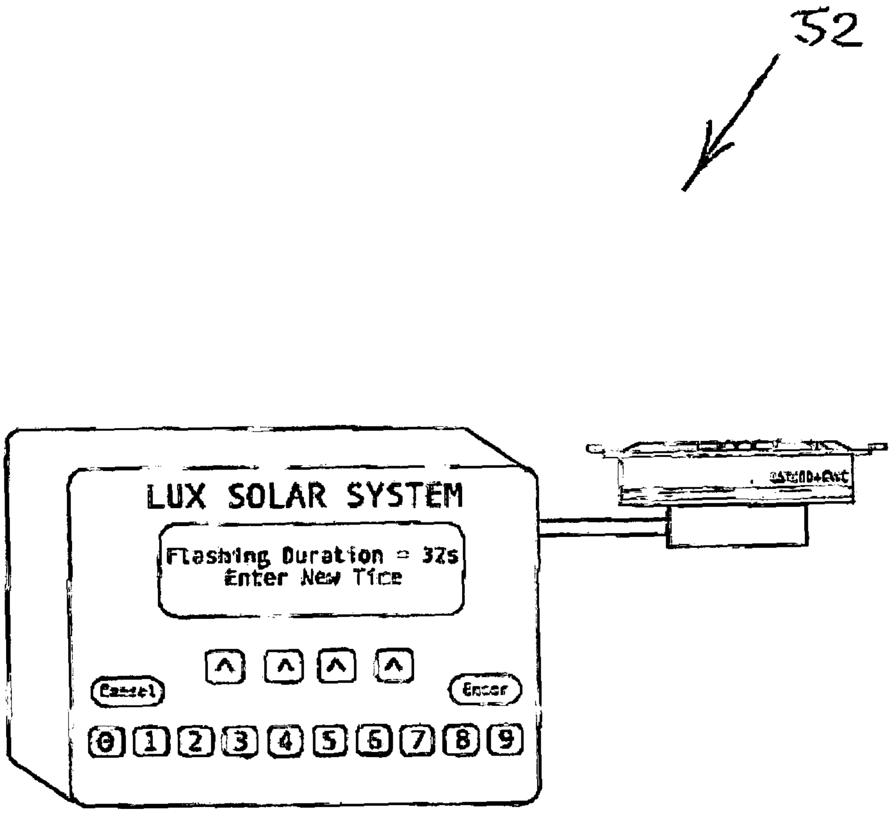
FIG. 10A is a front plan view of a preferred control panel for the control circuit.

A third preferred switch structure 150 is motion-activated and includes at least one and preferably several support springs 172, which preferably are coil springs 172, resting on the base layer 120 in each mat 100 or 100A corner area, on which the protective layer 130 rests. Between the protective and base layers 130 and 120, respectively, is a compression sensing device 174, one example of which being a push button switch 174, connected through a wire 176 within a conduit 178 extending to junction box 190, which in turn is connected by control circuit cable 54 to the control circuit 50. See FIGS. 5 and 5A. Compression sensing device 174 alternatively could be an electronic device. Once again, the junction box 190 fits through a correspondingly sized and shaped junction box opening 122 in the base layer 120, and into a junction box recess 210 in the sidewalk concrete, generally as illustrated in FIG. 9. The weight of a pedestrian stepping on the mat 100 or 100A compresses support springs 172 so that the protective layer 120 advances downwardly into contact with and presses down a button or plunger 174P on, and thereby activates, the push button switch 174. As a result, the control circuit 50 causes the alert lights 20 to activate. An example of a suitable push button switch 174 is the HONEYWELL™ 914CE1-9 sold by ALLIED™, with top plunger.

Figure 6:
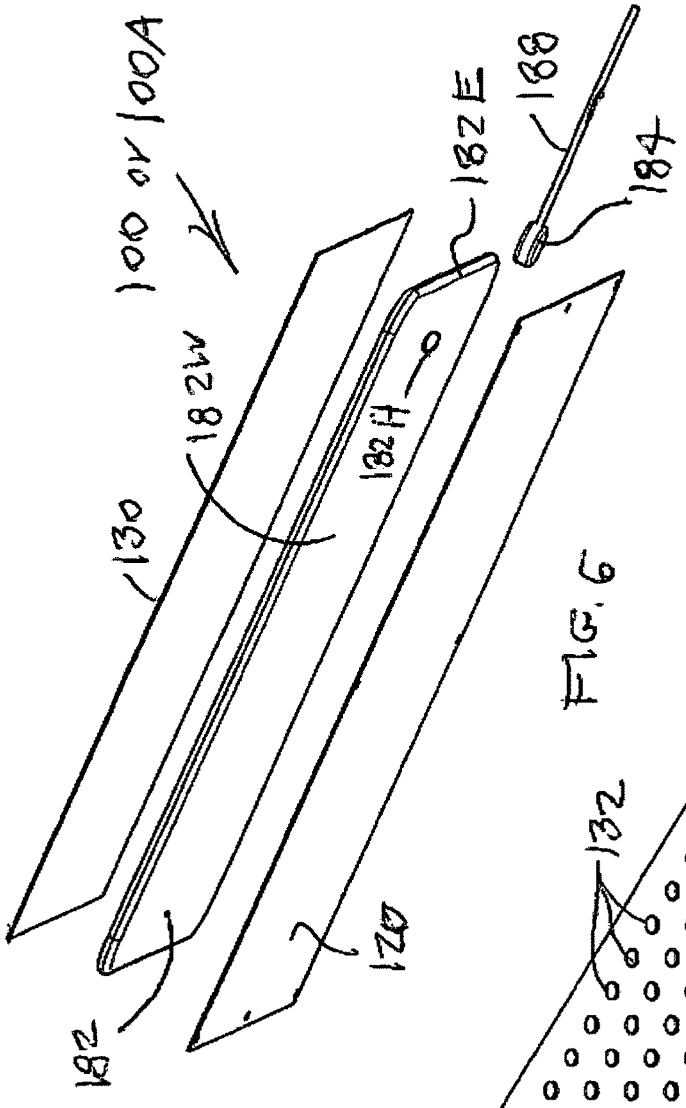
FIG. 6 is an exploded, perspective side-bottom view of the fourth preferred switch structure which contains a bladder and is pressure-activated. The signal wire is shown in broken lines within its conduit.
Figure 6A:
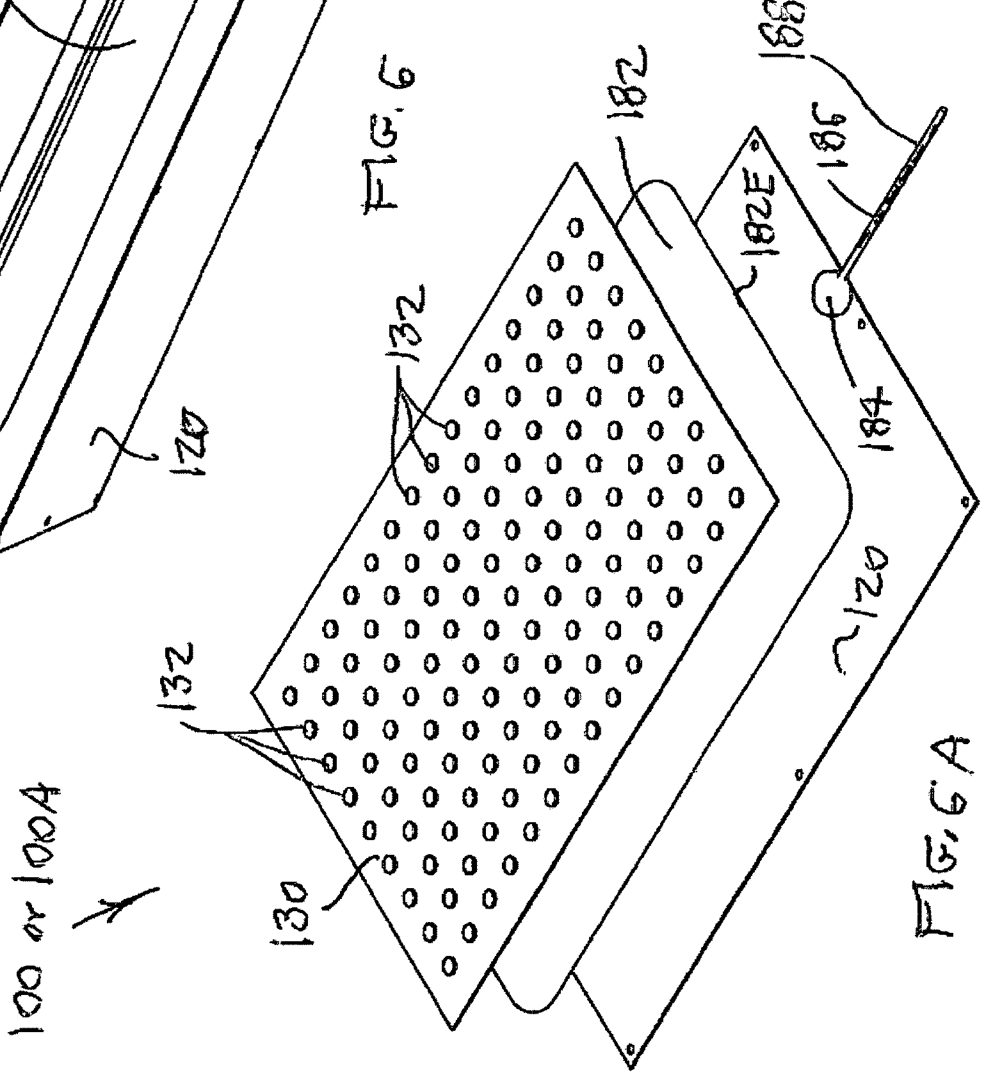
FIG. 6A is an exploded top view of the embodiment of FIG. 6.
Figure 7:
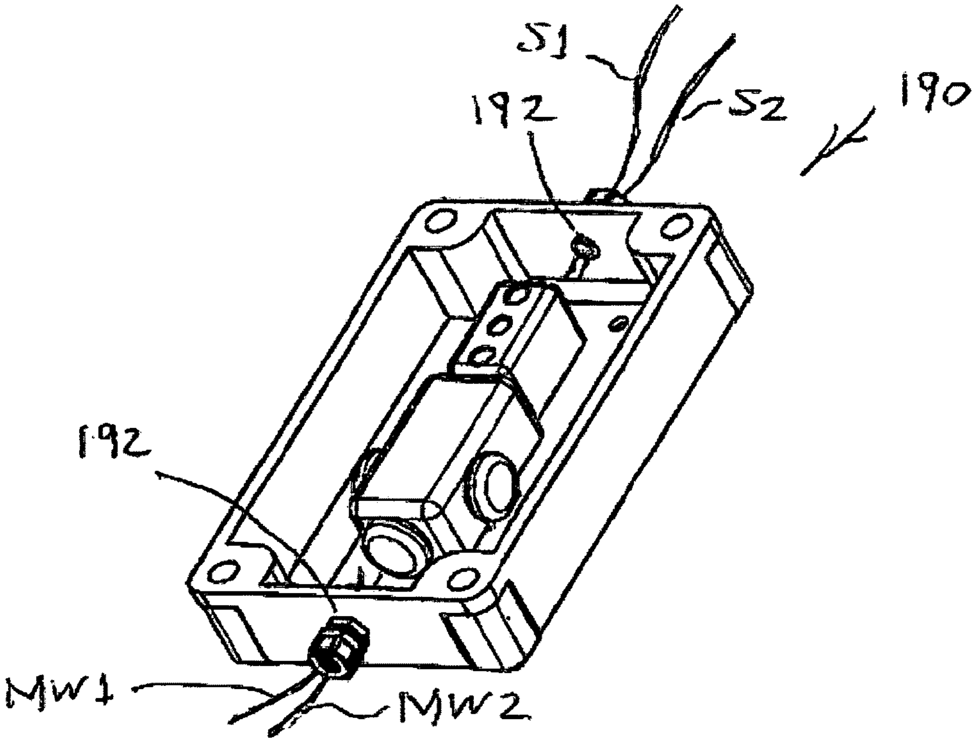
FIG. 7 is a perspective view of the preferred junction box with its cover panel removed to reveal its interior.
Figure 8:
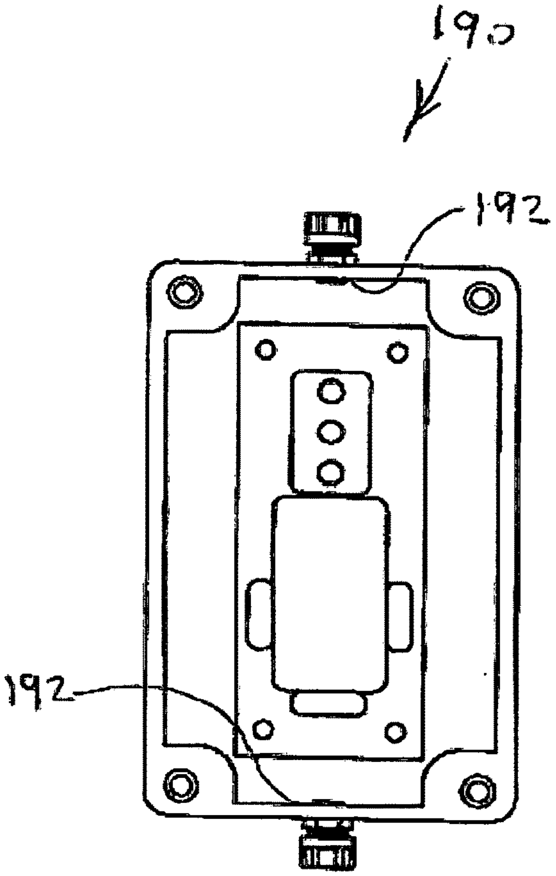
FIG. 8 a front plan view of the junction box of FIG. 7.

Finally, a fourth preferred switch structure 150 is that of FIGS. 6 and 6A, which includes a bladder 182 that is broad and flat, as illustrated, and is sized to fit and mostly or entirely fill the space between base layer 120 and protective layer 130. Bladder 182 contains a fluid, which may be a liquid or gas and preferably is air. A pressure sensor in the form of a pressure transducer 184 is positioned adjacent to the bladder 182 and is connected to the fluid in the bladder 182 through a hole 182H in the bladder wall 182W, either directly or through a tube or hose (not shown) to measure the magnitude of the pressure of the internal fluid. (Alternatively, although less preferred, transducer 184 is placed in abutting relation with the bladder 182 between and bearing against the bottom of bladder 182 and base layer 120, or is located between and bears against the top of bladder 182 and protective layer 130, or between an edge of the bladder 182 and the mat frame 140.) The weight of a pedestrian stepping on the mat 100 or 100A presses the protective layer 130 against the bladder 182, pressurizing the fluid within the bladder 182 and causing the bladder side edge 182E to expand outwardly and apply pressure against the pressure transducer 184. A signal wire 186 within a conduit 188 extends from pressure transducer 184. The pressure transducer 184 thereupon sends a fluid pressure measurement signal through signal wire 186 to the junction box 190, which relays the detection signal through the control circuit cable 54 to the control circuit 50, which activates the alert lights 20 if the pressure measurement exceeds a preset threshold. An example of a suitable pressure transducer 184 is the OMEGA™ General Purpose Stainless Steel Pressure Transducer, Item No. PX309-100GI.

The system mat 100 or 100A may be fitted into a wide and shallow mat recess 200 formed in sidewalk S concrete, with a mat recess 200 depth substantially matching the mat 100 or 100A thickness so that the upper surface of the mat is flush with the sidewalk S upper surface, and pedestrians do not trip on the edge of the mat 100 or 100A. The mat recess 200 also has a width and length substantially matching the mat 100 or 100A width and length, and is located adjacent to a crosswalk CR entrance, A preferred additional feature of the system to make the system mat easier to remove and install is a junction box 190 with wire passing holes 192 in its sides into which two mat wires MW1 and MW2 and two system circuit wires S1 and S2 are inserted and respectively electrically connected together by watertight gel connectors, so as to be easily removable from each other. See FIGS. 7 and 8. As a result, a system mats 100 and 100A each can be quickly installed and electrically connected to the system circuit 40 with minimal tools and skill requirements. And, by the same token, the system mat 100 or 100A can be quickly and easily removed for repair or replacement as needed. A junction box recess 210 for receiving and mounting the junction box 100 underneath the system mat 100 or 100A preferably is formed in the sidewalk S concrete and recessed in the bottom surface of the mat recess 200. See FIG. 9.

The system mat alternatively is connected to the control box circuit wirelessly. For this version, activation signals are sent from a mat transmitter (not shown) to a control circuit receiver (not shown).

The system mat alternatively is formed of hard rubber containing spaced apart contact wires or contact sheets formed of metal, conductive strips of rubber or other conductive material, and is simply glued to the surface of the sidewalk at a crosswalk entrance.

The wires or sheets do not have to be metal, but alternatively can be strips of conductive rubber or other conductive material. Alternative system mats 100 and 100A include but are not limited to parallel wires of metal or other material spaced on the bottom layer in a grid. Above the wires, with a slight clearance, are small metal buttons not electrically connected to anything. When the mat is compressed, the metal buttons are lowered and touch two wires and thereby close the circuit.

More than two mats 100 or 100A that can be electrically interconnected to accommodate the sidewalk S area and to function together as parts of the present system 10.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A crosswalk lighting system for alerting drivers that a person is entering or crossing at a crosswalk, comprising:

A road marked with a crosswalk;

at least one alert light mounted adjacent to the crosswalk;

a system power source;

a system circuit connected to said system power source and to said at least one alert light; and a system mat containing a switch structure activated by the weight of a pedestrian stepping on the system mat, and mounted adjacent to the road at a first end of the crosswalk for activation in response to the weight of a pedestrian stepping on a system mat as the pedestrian approaches the entrance of the crosswalk.

2. The system of claim 1, wherein said at least one alert light comprises a spaced series of alert lights embedded in and extending across the road adjacent and parallel to the crosswalk.

3. The system of claim 1, comprising first and second said weight-activated system mats respectively on first and second sides of the road at opposing first and second entrances to the crosswalk.

4. The system of claim 1, additionally comprising a control box and a control circuit connected to said system circuit and housed in said control box, wherein said system mat is connected to said control circuit through said system circuit;

such that when a pedestrian steps on said system mat and thereby closes said weight-activated switch, said system circuit delivers electric power from said power source to said control circuit which activates said at least one alert light one of continuously and in intermittent flashes, for a preset length of time for a pedestrian to cross the road.

5. The system of claim 4, additionally comprising a system post mounted upright adjacent to said system mat, wherein said control box is mounted to said system post.

6. The system of claim 5, wherein said power source comprises a solar panel mounted to the top or side of each said system post and oriented to gather sunlight.

7. The system of claim 4, wherein said system mat is operationally connected to said control box circuit wirelessly, additionally comprising a signal transmitter connected to said system mat and a signal receiver connected to said control circuit.

8. The system of claim 1, wherein said switch structure comprises:

a top conductor sheet having at least one top contact and a bottom conductor sheet having at least one bottom contact, said top conductor sheet and said bottom conductor sheet being separated by a compressible sheet having at least one contact opening registering with said at least one top contact and said at least one bottom contact, such that downward pressure on said top contact sheet compresses said compressible sheet until said at least one top contact and said at least one bottom contact touch each other through said contact opening and thereby close said weight-activated switch and said circuit.

9. The system of claim 8, wherein said system mat additionally comprises a base layer beneath said switch structure.

10. The system of claim 9, wherein said system mat additionally comprises a protective layer on top of said switch structure.

11. The system of claim 9, wherein said protective layer and said base layer are rigid panels and wherein said switch structure comprises:

at least one load cell which converts force into a measured output for detecting the weight of a pedestrian when he or she steps onto said protective layer and thereupon to generating a weight detection signal conveying the amount of weight detected; and a signal wire extending from said load cell and carrying the weight detection signal to said control circuit which determines whether the weight detected by the load cell meets a minimum magnitude threshold requirement, and if the requirement is met, activates said alert lights.

12. The system of claim 9, wherein said base layer is a panel formed of non-corrosive material.

13. The system of claim 12, wherein said protective layer is a panel formed of non-corrosive material.

14. The system of claim 13, wherein said protective layer has a non-slip upper surface comprising a plurality of ADA domes to make the system mat recognizable by touch to the blind.

15. The system of claim 13, wherein said system mat additionally comprises a mat frame extending around the periphery of said mat and holding said base layer switch structure and protective layer together in stacked relation.

16. The system of claim 15, wherein said protective layer and said base layer are rigid panels and wherein said switch structure comprises:

a support springs resting on said base layer, and said protective layer resting on said support spring; and a compression sensing device located between said base panel and said protective panel and connected through a signal wire to said control circuit;

such that the weight of a pedestrian stepping onto said mat compresses said support spring causing said protective layer to advance downwardly into contact with and to press against said compression sensing device, thereby sending a signal to said control circuit, causing said alert lights to activate.

17. The system of claim 15, wherein said protective layer and said base layer are rigid panels and wherein said switch structure comprises:

a bladder between said base layer and said protective layer, said bladder containing a fluid;

a pressure transducer in fluid communication with said fluid within said bladder for measuring the magnitude of the pressure of said fluid, and a signal wire extending from said pressure transducer to said control circuit;

such that the weight of a pedestrian stepping onto said mat presses said protective layer against said bladder, increasing the pressure of said fluid within said bladder, whereupon said pressure transducer measures the magnitude of the pressure of said fluid and sends a pressure measurement signal through said signal wire to said control circuit which activates said alert lights if the measured pressure exceeds a preset threshold.

18. The system of claim 15, wherein said system mat has a mat edge, and wherein said mat frame comprises channel members mounted along the periphery of said layers, such that one channel member extends along said edge of said mat, and said channel member has parallel channel side walls which fit snugly over the bottom surface of said base layer and the top surface of said protective layer.

19. The system of claim 18, wherein said system mat has four mat edges, comprising a plurality of said channel members, said channel members being interconnected at the corners of said system mat where said channel members meet.

20. The system of claim 1, additionally comprising a mat recess in the sidewalk, wherein said system mat is fitted into said mat recess, said mat recess having a depth matching the thickness of said system mat, such that the upper surface of said system mat is flush with the sidewalk to prevent pedestrians from tripping on said system mat.

21. The system of claim 20, wherein said mat recess has a width and length matching the system mat width and length, and is located adjacent to a crosswalk entrance.

22. The system of claim 20, additionally comprising a junction box with wire passing holes into which two mat wires and two system circuit wires pass and are electrically connected together, to be easily removable from each other;

such that a system mat can be quickly and easily installed and electrically connected, and easily electrically disconnected and removed from the crosswalk lighting system.

23. The system of claim 22, additionally comprising a junction box recess for receiving and mounting said junction box underneath said system mat, said junction box recess being formed in the sidewalk and recessed into the bottom of said mat recess.

24. The system of claim 1, wherein said switch structure comprises a compressible sheet containing one of contact wires and contact plates connected to said system circuit.

* * * * *